July 15, 1969  R. F. GEORGE ET AL  3,455,616
BALL BEARING SPACER
Filed Aug. 21, 1967
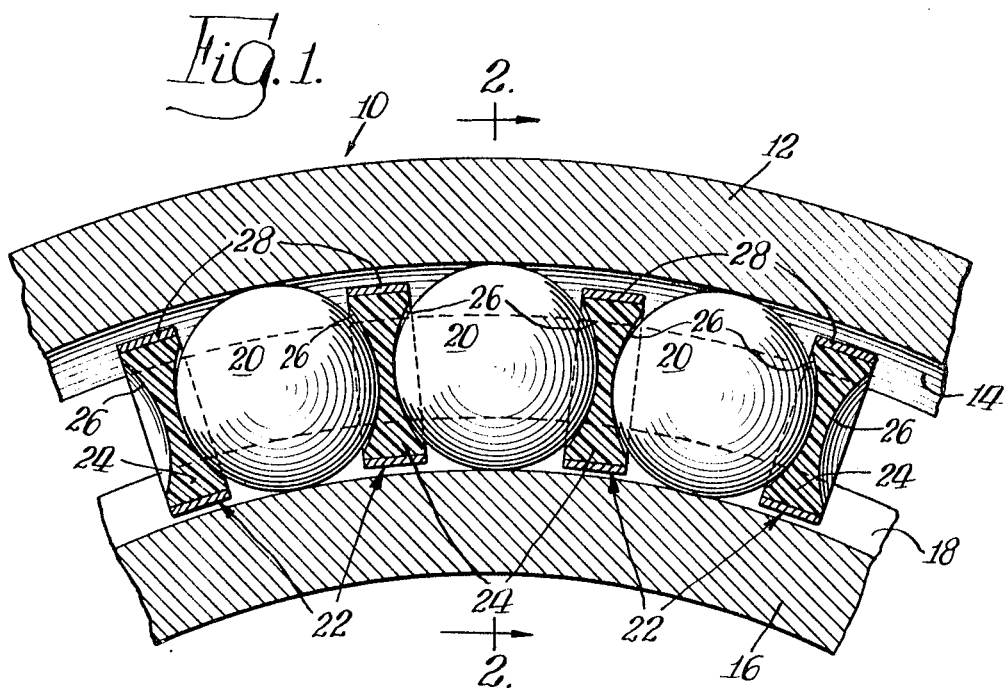
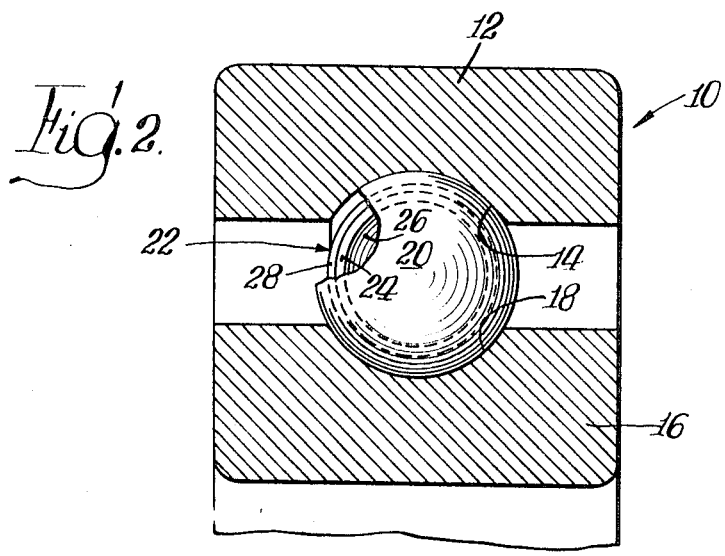
Inventors:-
Richard F. George
Halford L. Knotts, 3,455,616
BALL BEARING SPACER
Richard F. George and Halford L. Knotts, Muskegon, Mich., assignors to The Kaydon Engineering Corporation, Muskegon, Mich., a corporation of Michigan
Filed Aug. 21, 1967, Ser. No. 662,076
Int. Cl. F16c 19/20, 33/00
U.S. Cl. 308—199                                     6 Claims

ABSTRACT OF THE DISCLOSURE

A spacer adapted for interposition between adjacent balls in a ball bearing assembly and having a body portion with oppositely directed ball-engaging sides and a band surrounding the body portion.

BACKGROUND OF THE INVENTION

Field of the invention

The present invention pertains generally to ball bearing assemblies suitable for heavy duty use, for example, in connection with the turntables of cranes, power shovels and the like, and more particularly to spacers interposed between the balls of such ball bearing assemblies.

Description of the prior art

Various forms of spacers have been interposed between the balls of ball bearing assemblies to provide intermediate bearing surfaces whereby to prevent the balls from coming into direct frictional contact. Certain of these spacers have been fabricated entirely of a resilient deformable material, while other spacers have comprised a resiliently deformable body portion and a surrounding metal band. The first type of spacer has the disadvantage that the spacer is subject to rupture or cracking under extreme loads due to circumferential tension. Banded spacers of one type have the disadvantage that the edges of the band are allowed to engage the adjacent balls. Such metal-to-metal contact produces additional undesirable friction between the successive balls and spacers. Banded spacers of another type are characterized by resiliently deformable body portions molded in place, such that on cooling to ambient temperatures the molded body portions shrink away from the metal bands; consequently, such spacers derive little or no benefit from the strength of the bands. Conventionally, spacers have oppositely directed ball-receiving spherical seats in the sides thereof, with the radius of curvature of each seat coinciding with the radius of curvature of the adjacent ball. This full-area contact of the spacer with the ball has made lubrication of the contact area difficult and unsatisfactory.

SUMMARY OF THE INVENTION

The present invention contemplates the provision of a ball bearing spacer comprising a body portion having a cylindrical periphery and a continuous band press-fitted on the cylindrical periphery whereby the body portion is subjected to compressive stress and the band is subjected to tensile stress. By pre-stressing or pre-loading the components of the spacer, the body portion thereof is materially increased in strength and rupture or cracking thereof is substantially eliminated. Additionally, the band is mounted on the body portion of the spacer with the edges thereof being spaced inwardly of the radii of curvature of the seats whereby to prevent engagement between the band and the balls. By thus confining engagement of the balls with the body portion, which is fabricated of a resiliently deformable material having a substantially lower coefficient of friction than has the band, frictional forces caused by a ball rolling against the spacer while under load are appreciably reduced. Still further, the body portion of the spacer is formed with a pair of oppositely directed concave spherical ball-engaging seats which have a radius of curvature greater than the radius of curvature of the balls. The clearances thus provided permits the balls to carry lubricant to the areas of contact between the balls and spacers as the balls rotate.

BRIEF DESCRIPTION OF THE DRAWING

FIGURE 1 is a median sectional view of a portion of a ball bearing assembly incorporating the principles of the present invention; and FIGURE 2 is a sectional view of the bearing assembly of FIGURE 1, taken substantially along the line 2—2 in FIGURE 1, looking in the direction indicated by the arrows.

DESCRIPTION OF THE PREFERRED EMBODIMENT

Referring now to the drawing, there is indicated generally by the reference numeral 10 a ball bearing assembly incorporating the principles of the present invention. The assembly 10 comprises an outer ring 12 having an annular concave groove or bearing race 14, an inner ring 16 having an annular concave groove or bearing race 18, and a plurality of spherical anti-friction elements or balls 20 received in and guided by the races 14 and 18.

Interposed between each pair of adjacent balls 20, in accordance with the present invention, is a spacer 22. Each spacer 22 is comprised of a body portion 24 having a pair of oppositely directed concave spherical ball-engaging seats 26 formed in the sides thereof. The radius of curvature of each seat 26 is greater than the radius of curvature of the balls 20 whereby to provide clearances which permit the balls to carry lubricant within the bearing assembly generally to the specific areas of contact between the balls and spacers as the balls rotate. The body portion 24 is fabricated of a resiliently deformable material such as a molded nylon reinforced with short lengths of glass fiber.

The body portion 24 has a cylindrical periphery on which a continuous metal band 28 is press-fitted. During assembly of the band 28 on the body portion 24, and as a result of the interference fit therebetween, the body portion 24 is subjected to compressive stress and the band 28 is subjected to tensile stress. In this manner, the strength of the body portion 24 is materially increased to compensate for circumferential tension, and rupture or cracking thereof under load is substantially eliminated. In addition, the overall strength of the spacer 22 is further increased because the greater tensile strength of the metal band 28, by reason of the interference fit, augments the strength of the relatively weaker body portion 24.

It will be noted further that the band 28 is mounted on the body portion 24 with the edges thereof being spaced inwardly of the radii of curvature of the seats 26. Because the edges of the band 28 do not intersect the radii of curvature of the seats 26, engagement between the band 28 and the balls 20 is prevented. Consequently, the balls 20 contact solely the body portion 24, which has a lower coefficient of friction than metal, and the frictional forces resulting from rolling engagement of the balls with the spacer 22 while under load are appreciably reduced.

When the bearing assembly 10 is subjected to heavy loads, the balls 20 tend to crowd ever more closely together as they enter the zone or zones of heaviest loading. Conversely, the balls 20 tend to spread further apart as they leave the zone or zones of heaviest loading. While alternative crowding and spreading of the balls 20 would be impeded by rigid spacers with a resultant increase in friction, such variation in circumferential spacing between the balls is accommodated in the bearing assembly of the present invention by the elasticity of the body portion 24 thereby minimizing friction. Also, due to the elasticity of the body portion 24, the area of contact between the spacer 22 and the adjacent balls 20 increases as the loading increases, thereby permitting greater allowable contact loads. To minimize the interference between the spacers 22 and the races 16 and 18 during relative movement therebetween, the spacers are formed with an outside diameter that is less than the diameter of the balls 20.

While there has been shown and described a preferred embodiment of the present invention, it will be understood by those skilled in the art that various rearrangements and modifications may be made therein without departing from the spirit and scope of the invention.

We claim:

1. For interposition between adjacent balls in a ball bearing assembly having a plurality of spherical balls, a spacer comprising a resiliently deformable body portion having a cylindrical periphery and oppositely directed ball-engaging sides, and a continuous band press-fitted on said cylindrical periphery whereby said body portion is subjected to compressive pre-stress and said band is subjected to tensile pre-stress to substantially eliminate rupture or cracking under load.

2. The spacer of claim 1 wherein said body portion has a lower coefficient of friction with the adjacent balls than has the band.

3. The spacer of claim 1 wherein said band is formed of metal.

4. The spacer of claim 1 wherein said sides of said body portion are formed with oppositely directed concave spherical ball-engaging seats.

5. The spacer of claim 4 wherein said seats have a radius of curvature greater than the radius of curvature of the balls.

6. The spacer of claim 5 wherein said band is mounted on said cylindrical periphery with the edges thereof being spaced inwardly of the radii of the curvature of said seats whereby to prevent engagement between said band and the balls.

References Cited

UNITED STATES PATENTS 2,897,021 7/1959 Zeilman _____ 308—199
3,220,785 11/1965 Noll et al. _____ 308—199

MARTIN P. SCHWADRON, Primary Examiner

FRANK SUSKO, Assistant Examiner